(12) United States Patent
Yang et al.

(10) Patent No.: US 7,724,833 B2
(45) Date of Patent: May 25, 2010

(54) RECEIVER FOR AN LDPC BASED TDS-OFDM COMMUNICATION SYSTEM

(75) Inventors: Lin Yang, Fremont, CA (US); Dinesh Venkatachalam, Fremont, CA (US)

(73) Assignee: Legend Silicon Corporation, Fremont, CA (US)

( * ) Notice: Subject to any disclaimer, the term of this patent is extended or adjusted under 35 U.S.C. 154(b) by 646 days.

(21) Appl. No.: 11/740,712

(22) Filed: Apr. 26, 2007

(65) Prior Publication Data

US 2008/0025424 A1 Jan. 31, 2008

Related U.S. Application Data

(60) Provisional application No. 60/820,319, filed on Jul. 25, 2006.

(51) Int. Cl.
*H04L 27/28* (2006.01)
(52) U.S. Cl. .................................................. 375/260
(58) Field of Classification Search ................ 375/260, 375/316, 232, 130, 134, 267; 714/776, 801, 714/755; 455/522; 370/464, 466, 477, 330
See application file for complete search history.

(56) References Cited

U.S. PATENT DOCUMENTS

| | | | |
|---|---|---|---|
| 6,304,611 B1 | 10/2001 | Miyashita et al. | |
| 6,810,007 B1 | 10/2004 | Kim | |
| 6,952,454 B1 | 10/2005 | Jalali et al. | |
| 7,177,365 B2 | 2/2007 | El-Gamal et al. | |
| 2005/0281318 A1* | 12/2005 | Neugebauer | 375/134 |

* cited by examiner

*Primary Examiner*—Khai Tran
(74) *Attorney, Agent, or Firm*—Patent Law Group LLP; Carmen C. Cook (57) ABSTRACT

An LDPC based TDS-OFDM receiver for demodulating an LDPC encoded TDS-OFDM modulated RF signal downconverted to an IF signal includes a synchronization block, an equalization block, an OFDM demodulation block and a FEC decoder block. The synchronization block generates a baseband signal from a digitized IF signal and performs correlation of a PN sequence in a signal frame of the received RF signal with a corresponding locally generated PN sequence to provide signals for performing carrier recovery, timing recovery and parameters for channel estimation. The equalization block performs channel estimation and channel equalization. The OFDM demodulation block performs demodulation on the baseband signal to recover OFDM symbols and converts the OFDM symbols to frequency domain. The FEC decoder block includes an LDPC decoder for decoding the OFDM symbols based on the LDPC code to generate a digital output signal indicative of the data content of the RF signal.

27 Claims, 5 Drawing Sheets

RECEIVER FOR AN LDPC BASED TDS-OFDM COMMUNICATION SYSTEM

CROSS-REFERENCE TO RELATED APPLICATION

This application claims the benefit of U.S. Provisional Patent Application Ser. No. 60/820,319, filed on Jul. 25, 2006, which application is incorporated herein by reference in its entirety.

FIELD OF THE INVENTION

The invention relates to an LDPC based TDS-OFDM communication system and, in particular, to an LDPC based TDS-OFDM receiver incorporating an LDPC decoder and an OFDM demodulator for use in the LDPC based TDS-OFDM communication system.

DESCRIPTION OF THE RELATED ART

Transmission of Internet signals and of digital television (TV) signals poses different but continuing challenges for each activity. Internet signal transmission faces the problems of reliable broadcasting and multicasting of messages, provision of mobility for signal transmitter and for recipient, and limitations on information transfer rate ("speed"). Transmission of digital TV signals faces the problems of providing an inter active system, providing point-to-point information transfer capacity, and mobility of the recipient. A communication system for digital TV signals should be efficient in the sense that the payload or data portion of each transmitted frame is a large fraction of the total frame. At the same time, such a communication system should be able to identify, and compensate for, varying characteristics of the transmission channel, including but not limited to time delay associated with transmission of each frame.

Orthogonal frequency-division multiplexing ("OFDM") modulation schemes are known. OFDM, also sometimes referred to as discrete multitone modulation (DMT), is a complex modulation technique for transmission based upon the idea of frequency-division multiplexing (FDM) where each frequency channel is modulated with a simpler modulation. In OFDM, the frequencies and modulation of FDM are arranged to be orthogonal with each other which almost eliminates the interference between channels. Conventional OFDM transmission uses a guard interval period between OFDM data frames to provide a protective separation between transmitted OFDM frames. The guard interval is usually only necessary when multipath effect is of concern. The guard interval can include zero-padding or a cyclic prefix of the OFDM data. The guard interval represents a time period between OFDM data frames effective for protecting data against inter-subcarrier interference in the frequency domain and inter-frame interference in the time domain.

U.S. Pat. No. 7,072,289 to Lin Yang et al. describes a time-domain synchronous (TDS) OFDM modulation scheme (TDS-OFDM). In TDS-OFDM modulation, a pseudo-noise (PN) sequence is inserted in the protective guard interval between data frames to enable synchronization and channel estimation. The TDS-OFDM modulation is different from the conventional OFDM or coded OFDM modulation in that the TDS-OFDM modulation scheme does not use the cyclic repeat of the OFDM data in the guard interval. Rather, a PN sequence is used to allow the receiver to achieve faster synchronization, faster frame and timing recovery and a more robust channel estimation to recover the transmitted information with no additional loss of spectrum efficiency. In one application, a TDS-OFDM modulation scheme utilizes 3780 symbols representing a fixed FFT (Fast Fourier Transform) size of 3780. The fixed FFT size is particularly useful for the TDS-OFDM modulation scheme. In general, TDS-OFDM modulation schemes can use a FFT size of $2^n$ integer multiple and the FFT size does not have to be fixed.

Error correction and channel coding schemes are often employed to reduce transmission errors in a communication channel. A low-density parity check (LDPC) code is an error correcting code for use in transmitting a message over a noisy transmission channel and performing forward error correction (FEC). An LDPC code may be viewed as being a code having a binary parity check matrix such that nearly all of the elements of the parity check matrix have values of zeros. While LDPC codes and other error correcting codes cannot guarantee perfect transmission, the probability of lost information can be made as small as desired. LDPC codes were the first coding scheme to allow data transmission rates close to the theoretical maximum, the Shannon Limit. At its discovery, LDPC codes were found to be impractical to implement in most cases due to the heavy computational burden in implementing the codes and the encoder for the codes and thus were not widely used. However, LDPC codes have since been rediscovered and have been widely applied in communication systems.

SUMMARY OF THE INVENTION

According to one embodiment of the present invention, an LDPC based TDS-OFDM receiver for receiving and demodulating an RF signal modulated using a TDS-OFDM (Time-Domain Synchronous Orthogonal Frequency-Division Multiplexing) modulation scheme and encoded using an LDPC (low density parity check) code where the RF signal is downconverted to an IF signal includes a synchronization block, an equalization block, an OFDM demodulation block and a FEC decoder block. The synchronization block receives a digital IF signal indicative of the IF signal and generates a baseband signal from the digital IF signal. The synchronization block performs correlation of a PN sequence in a signal frame of the received RF signal with a corresponding locally generated PN sequence where the PN sequence correlation providing signals for performing carrier recovery, timing recovery and parameters for channel estimation. The equalization block performs channel estimation and channel equalization. The OFDM demodulation block performs demodulation on the baseband signal where the OFDM demodulation block recovers OFDM symbols in the signal frame of the RF signal and converts the OFDM symbols to frequency domain. The FEC (forward error correction) decoder block includes an LDPC decoder for decoding the OFDM symbols based on the LDPC (low density parity check) code to generate a digital output signal indicative of the data content of the RF signal.

According to another aspect of the present invention, a method for demodulating an LDPC encoded TDS-OFDM modulated RF signal includes receiving a digital IF signal being down-converted from a RF signal; converting the digital IF signal to a baseband signal; performing synchronization of the baseband signal using the PN sequence in the signal frame of the RF signal; generating signals for carrier recovery, timing recovery and channel estimation; performing channel estimation using the signals for channel estimation; recovering OFDM symbols from the baseband signals; performing equalization of the baseband signal; performing FEC decoding of the OFDM symbols, the FEC decoding comprising decoding the OFDM symbols based on an LDPC (low density parity check) code; and generating a digital output signal indicative of the data content of the RF signal.

The present invention is better understood upon consideration of the detailed description below and the accompanying drawings.

DETAILED DESCRIPTION OF THE PREFERRED EMBODIMENTS

In accordance with the principles of the present invention, an LDPC based TDS-OFDM receiver for use in an LDPC based TDS-OFDM communication system includes a synchronization block, an OFDM demodulator and an LDPC decoder where the synchronization of the received signal is based on the PN sequence inserted in the guard intervals of the signal frames. The receiver receives LDPC encoded TDS-OFDM modulated incoming RF (radio frequency) signals and performs TDS-OFDM demodulation to recover the OFDM symbols in the received RF signals. Finally, LDPC forward error correction (FEC) decoding is performed to recover the MPEG-2 transport stream in the received RF signals. The MPEG-2 transport stream includes valid data, synchronization and clock signals. The LDPC based TDS-OFDM receiver of the present invention can work in either single frequency or multiple frequency networks.

The LDPC based TDS-OFDM communication system provides many advantages over conventional communication systems and is particularly advantageous when applied in digital television broadcast systems to ensure enhanced television reception. One salient characteristic of the LDPC based TDS-OFDM communication system of the present information is that in each signal frame, the number of MPEG-2 transport stream data packets is always a pre-determined integer (e.g.: 2, 3, 4, 6, 8, 9, 12). In conventional OFDM modulation systems, the deterministic number of data packets in each signal frame is often not possible under all circumstances.

In the present description, a TDS-OFDM communication system refers to a communication system that utilizes the TDS-OFDM modulation scheme described in the aforementioned U.S. Pat. No. 7,072,289, entitled "Pseudo-Random Sequence Padding In An OFDM Modulation System," issued to Lin Yang et al., which patent is incorporated herein by reference in its entirety. In TDS-OFDM modulation, a PN (pseudo-noise) sequence is used in the data block guard intervals where the PN sequence satisfies selected orthogonality and closures relations. That is, the guard interval between each data frame is a PN sequence of a given length. The PN sequence is used for timing recovery, for carrier frequency recovery, channel estimation and synchronization. The PN sequence enables the receiver of the TDS-OFDM communication system to achieve faster synchronization, faster frame and timing recovery and a more robust channel estimation.

Furthermore, in the present description, the LDPC based forward error correction is implemented using a set of three LDPC codes having characteristics that are compatible with and particularly advantageous for application in a TDS-OFDM communication system. In one embodiment, the RF signals received by the LDPC based TDS-OFDM receiver of the present invention are transmitted under the TDS-OFDM transmission scheme described in copending and commonly assigned U.S. patent application Ser. No. 11/691,102, entitled "Transmitter For An LDPC based TDS-OFDM Communication System," of D. Venkatachalam et al., filed on Mar. 26, 2007, which patent application is incorporated herein by reference in its entirety. In particular, the TDS-OFDM transmission scheme uses 3780 symbols and the parameters of the LDPC codes are tuned to the 3780 symbol-based TDS-OFDM transmission scheme. The use of LDPC based forward error correction in the TDS-OFDM communication system of the present invention enables superior error correction properties approaching the Shannon Limit of the channel.

In one embodiment, the LDPC based TDS-OFDM receiver of the present invention is configured to decode the three quasi-cyclic LDPC codes described in copending and commonly assigned U.S. patent application Ser. No. 11/685,539, entitled "LDPC Codes Of Various Rates For An LDPC based TDS-OFDM Communication System," by Lei Chen, filed on Mar. 13, 2007, which patent application is incorporated herein by reference in its entirety. In the '539 patent application, three quasi-cyclic LDPC codes of rate 0.4, 0.6 and 0.8 and their associated parity check matrices are described. The three LDPC codes of the '539 patent application is implemented in the LDPC based TDS-OFDM communication system of the present invention to achieve superior error correction properties approaching the Shannon Limit of the channel.

Figure 1:
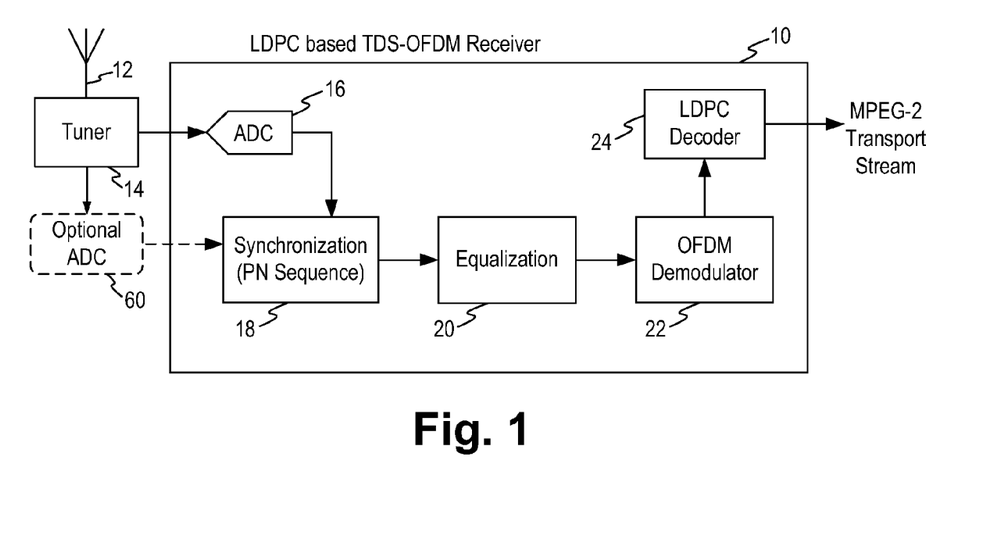
FIG. 1 is a block diagram of an LDPC based TDS-OFDM receiver according to one embodiment of the present invention.

FIG. 1 is a block diagram of an LDPC based TDS-OFDM receiver according to one embodiment of the present invention. Referring to FIG. 1, an LDPC based TDS-OFDM receiver 10 ("receiver 10") is coupled to receive incoming RF signals received on an antenna 12 and generate MPEG-2 transport stream as output signals. The primary function of receiver 10 is to determine from a noise-perturbed system, which of the finite set of waveforms have been sent by the transmitter and using a combination of signal processing techniques to reproduce the finite set of discrete messages sent by the transmitter.

In the present embodiment, the incoming RF signals are received by an RF tuner 14 where the RF input signals are converted to low-IF or zero-IF signals. In one embodiment, a digital terrestrial tuner is used to receive the incoming RF signal and picks the frequency bandwidth of choice to be demodulated by receiver 10. From tuner 14, the low-IF or zero-IF signals are provided to receiver 10 as analog signals or as digital signals. For instance, an optional analog-to-digital converter 60 may be coupled to tuner 14 to digitize the down-converted IF signals so that digitized down-converted IF signals are provided to receiver 10 without further digitizing. In the present embodiment, as shown in FIG. 1, an analog-to-digital converter 16 is provided in receiver 10 to digitize the analog IF signals from tuner 14.

In one embodiment, the LDPC based TDS-OFDM receiver 10 is implemented as a single integrated circuit. The tuner 14 is implemented outside of the integrated circuit of receiver 10.

In other embodiments, the LDPC based TDS-OFDM receiver may incorporate the tuner circuitry on the same integrated circuit. The degree of integration of receiver 10 is not critical to the practice of the present invention.

The LDPC based TDS-OFDM receiver 10 of the present invention includes four major functional blocks: a synchronization block 18, an equalization block 20, an OFDM demodulation block 22 and an LDPC FEC decoder block 24. In receiver 10, the synchronization block 18 operates on the PN sequence inserted in the guard intervals of the signal frames and performs Auto Frequency Control (AFC), carrier recovery to determine the carrier frequency, and timing recovery to determine the timing of the incoming signals. Synchronization block 18 also performs frame synchronization (FSYNC) to determine the start of each signal frame in the incoming signals and the frame ID of each signal frame so that the PN sequence associated with each signal frame used in the TDS-OFDM modulation can be determined. The equalization block 20 performs channel estimation and channel equalization. For OFDM modulation, the channel equalizer is typically a divider or a single multiplier.

OFDM demodulator 22 performs demodulation of the received signals by extracting the symbols and converting the signals to frequency domain. The LDPC FEC decoder 24 then provides forward error correction of the received signals based on the LDPC codes used to encode the data message. In the present embodiment, LDPC FEC decoder 24 decodes the received signals in accordance with the selected one of the three quasi-cyclic LDPC codes described in the aforementioned '539 patent application. Finally, receiver 10 generates an MPEG-2 transport stream as output signals indicative of the received RF signals.

Figure 2:
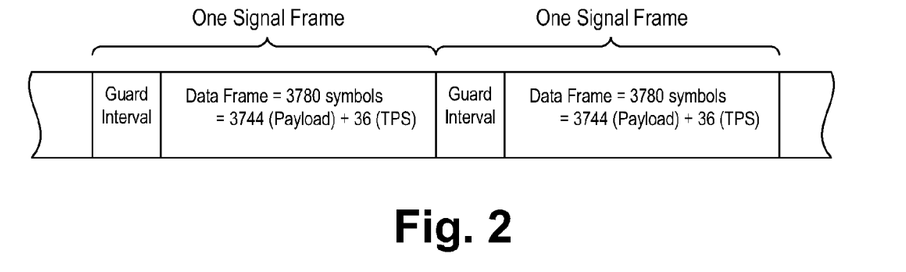
FIG. 2 illustrates a frame format for a TDS-OFDM signal frame according to one embodiment of the present invention.

The structure of the incoming data signals is first described. The digital data signals under the LDPC based TDS-OFDM transmission scheme are grouped in a series of hierarchical frames. FIG. 2 illustrates a frame format for a TDS-OFDM signal frame according to one embodiment of the present invention. Referring to FIG. 2, a TDS-OFDM signal frame includes a data frame of 3780 symbols preceded by a guard interval of various length. The data frame includes 3744 symbols for carrying the data payload and 36 symbols for carrying the Transmission Parameter Signaling (TPS). The TPS symbols carry information for the demodulator of the receiver to automatically adapt to the incoming transmission such as the FEC inner code rate and the time interleaver length.

Figure 5A:
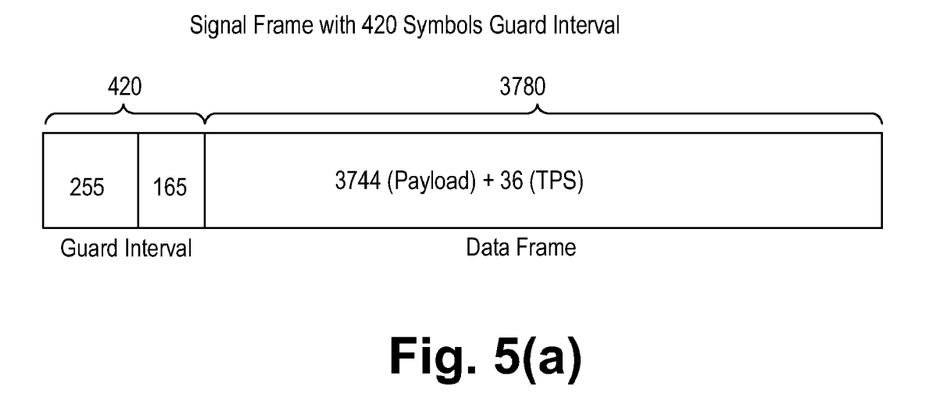
FIGS. 5(a)-(c) illustrate the signal frame structure for signal frames with PN420, PN595 and PN945 guard intervals, respectively.
Figure 5B:
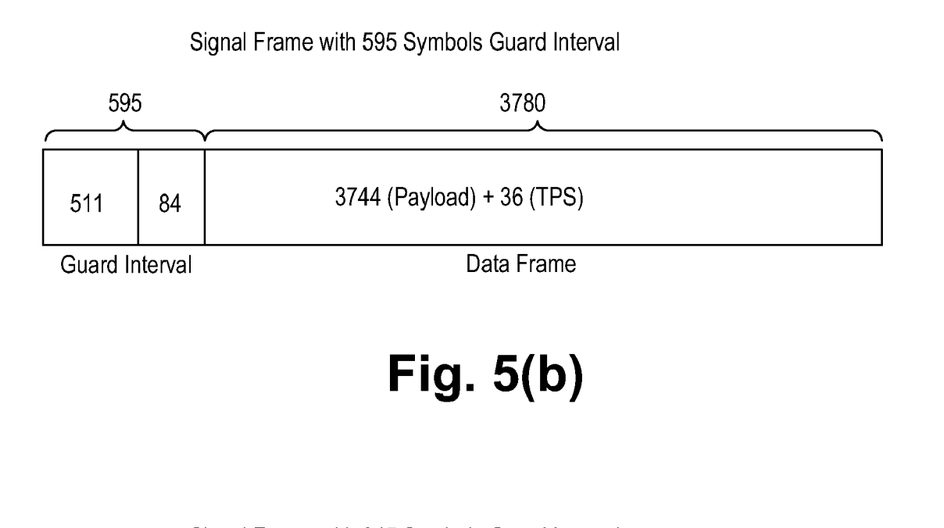
Figure 5C:
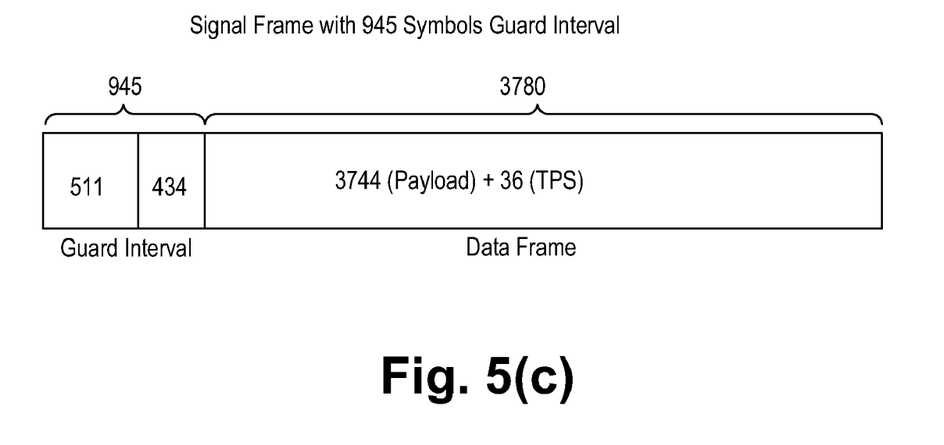

In one embodiment, the length of the guard interval can either be the frame length (3780 symbols) divided by 9 (420 symbols), as shown in FIG. 5(a), or the frame length divided by 4 (945 symbols), as shown in FIG. 5(c). The length of the guard interval can also have a length of 595 symbols, as shown in FIG. 5(b).

Figure 3:
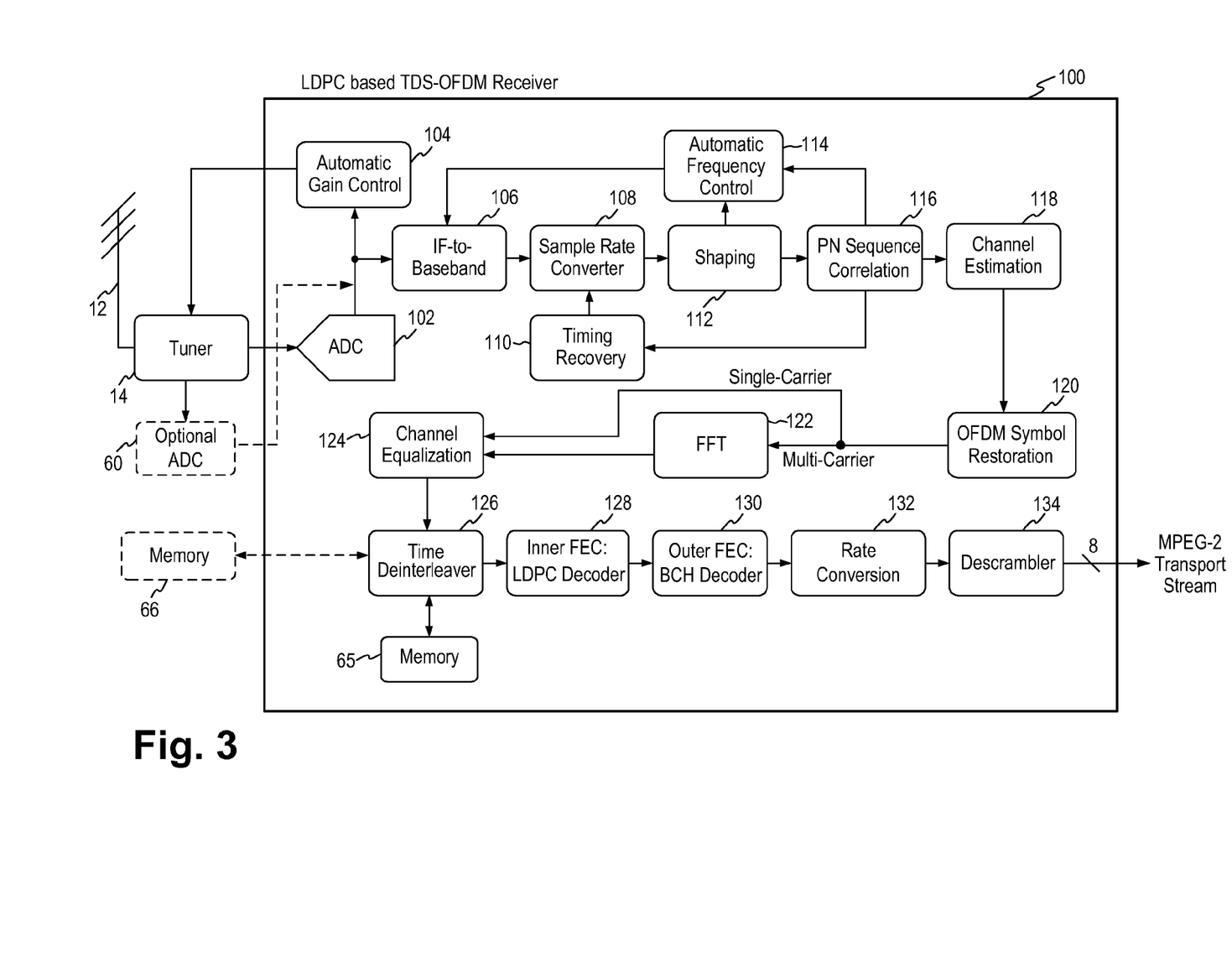
FIG. 3 is a schematic diagram illustrating the functional blocks of an LDPC based TDS-OFDM receiver according to one embodiment of the present invention.

Turning now to the detailed construction of the LDPC based TDS-OFDM receiver of the present invention. FIG. 3 is a schematic diagram illustrating the functional blocks of an LDPC based TDS-OFDM receiver according to one embodiment of the present invention. Referring to FIG. 3, an LDPC based TDS-OFDM receiver 100 (hereinafter "receiver 100") includes functional blocks implementing the synchronization, equalization, LDPC FEC decoding and OFDM demodulation functions where the TDS-OFDM synchronization and demodulation are performed according to the parameters of the LDPC based TDS-OFDM transmission scheme.

The configuration parameters of receiver 100 can be detected, or automatically programmed, or manually set. The main configurable parameters for receiver 100 include: (1) Subcarrier modulation type: QPSK, 16QAM, 64QAM; (2) FEC rate: 0.4, 0.6 and 0.8; (3) Guard interval: 420, 595 or 945 symbols; (4) Time deinterleaver mode: 0, 240 or 720 symbols; (5) Control frames detection; and (6) Channel bandwidth: 6, 7, or 8 MHz. The output signals of receiver 100 consist a parallel or serial MPEG-2 transport stream including valid data, synchronization and clock signals.

Turning to FIG. 3, the incoming RF signals received on an antenna 12 are coupled to a tuner 14 to be down-converted to low-IF or zero-IF signals. In the present embodiment, the analog low-IF or zero IF signals are provided to receiver 100 where an analog-to-digital converter (ADC) 102 in receiver 100 samples and digitizes the low-IF/zero-IF signals. In other embodiments, an ADC 60 may be provided outside of receiver 100 to digitize the down-converted IF signals and receiver 100 receives digital low-IF or zero-IF signals, as shown by the dotted line from ADC 60. In this case, ADC 102 is not needed and the digitized IF signals are coupled directly to the respective blocks of the receiver 100.

In LDPC based TDS-OFDM receiver 100, the digitized IF signals are provided to the automatic gain control (AGC) block 104 and the IF-to-Baseband conversion block 106. AGC block 104 compares the digitized IF signal strength with a reference. The difference is filtered and the filtered comparison result is fed back to tuner 14 to control the gain of the IF signals. More specifically, the filtered comparison result is used to control the gain of an amplifier in tuner 14.

At the IF-to-Baseband conversion block 106, the digitized IF signals from ADC 102 are converted to baseband signals. When the analog IF signals are sampled by ADC 102, the resulting digital signals are centered at a lower intermediate frequency (IF). For example, sampling a 36 MHz IF signal at 30.4 MHz results in the signal centered at a frequency of 5.6 MHz. The IF-to-Baseband conversion block 106 converts the digitized lower IF signal to a complex signal in the baseband frequency.

The baseband frequency signals are then provided to a sample rate converter 108. When the analog IF signals are digitized by ADC 102, the analog-to-digital converter uses a fixed sampling rate. Sample rate converter 108 operates to convert the signals from the fixed sampling rate used by the ADC to the OFDM sample rate. In one embodiment, sample rate converter 108 includes an interpolator to implement the sample rate conversion.

Sample rate converter 108 receives operation parameters from a timing recovery block 110. Timing recovery block 108 operates based on the TDS-OFDM modulation scheme where the PN sequence inserted in the guard intervals of the data frames is used to provide time recovery information. Timing recover block 108 receives input signals from a PN sequence correlation block 116 and computes the timing error. Timing recovery block 108 filters the error and use the filtered error signal to drive an NCO (Numerically Controlled Oscillator). The NCO controls the sample timing correction to be applied in the interpolator of the sample rate converter 108.

In accordance with the LDPC based TDS-OFDM transmission scheme of the present invention, the transmitted signal frame is filtered using a Square Root Raised Cosine (SRRC) filter. The received signals are therefore also applied with the same filter function in the shaping block 112. Shaping block 112 filters the converted signals by a Square Root Raised Cosine filter.

The output signal of shaping block 112 is provided to an automatic frequency control (AFC) block 114. There are often frequency offsets in the incoming RF signals. AFC block 114 calculates the frequency offsets and adjusts the IF-to-Baseband reference IF frequency for the IF-to-Baseband conversion block 108. In one embodiment, the frequency control under AFC block 114 is carried out in a coarse stage and a fine stage to improve the capture range and tracking performance.

The output signals from shaping block 112 are coupled to the PN sequence correlation block 116. PN sequence correlation block 116 is specific to the TDS-OFDM modulation scheme where a PN sequence is inserted into the guard intervals of the data frames. The correlation block 116 performs frame synchronization to determine the frame ID of each signal frame. From the frame ID, the PN sequence associated with each signal frame is determined. Then, the incoming PN sequence is correlated with the locally generated PN sequence to find the correlation peak which indicates the start of each signal frame and other synchronization information such as frequency offset and timing error. The retrieved timing error information is provided to timing recovery block 110 while the frequency offset information is provided to the AFC block 114 to facilitation the processing of the incoming IF signals, as described above.

At this point, receiver 100 has completed the synchronization function and the equalization function begins. The signals are provided to a channel estimation block 118. The channel time domain response is estimated based on the signal correlation obtained by PN sequence correlation 116. The channel frequency response is obtained by taking the Fast Fourier Transform (FFT) of the time domain response. In the present embodiment, a TDS-OFDM modulation scheme utilizes 3780 symbols representing a fixed FFT (Fast Fourier Transform) size of 3780. In other embodiments, TDS-OFDM modulation schemes can use a FFT size of $2^n$ integer multiple and the FFT size does not have to be fixed.

After the channel estimation block 18, the OFDM symbols in the signals are recovered and restored. In TDS-OFDM modulation, a PN sequence replaces the traditional cyclic prefix in the guard intervals. The OFDM symbol restoration block 120 operates to remove the PN sequence from the guard interval and restore the channel spread OFDM symbols. The OFDM symbol restoration block 120 essentially reconstructs the conventional OFDM symbols which can then be one-tap equalized.

After the OFDM symbols are recovered, the symbols are provided to a FFT block 122 to perform a Fast Fourier Transform operation. In the present embodiment, the FFT block 122 performs a 3780 point FFT. In the present embodiment, OFDM demodulator can operate in a multi-carrier mode or a single-carrier mode. In the multi-carrier mode, the recovered symbols are data in the time domain and the symbols are passed to the FFT block 122 where the FFT operation converts the symbols into corresponding signals in the frequency domain. On the other hand, in single-carrier mode, the recovered symbols are directly presumed to be the data in frequency domain. Therefore, when the single-carrier mode is selected, the FFT operation is bypassed.

Next, at block 124, channel equalization is carried out on the FFT transformed data based on the frequency response of the channel. Derotated data and the channel state information are sent to forward error correction for further processing. The output of channel equalization block 124 is sent to a time deinterleaver 126. In receiver 100, time deinterleaver 126 is used to increase the resilience of the received signals to spurious noise. The time deinterleaver 126 is a convolutional deinterleaver which needs a memory 65 with size B*(B−1)*M/2, where B is the number of the branch, and M is the depth. In the present embodiment, time deinterleaver 126 operates in one or two modes. For mode 1, B=52 and M=240, while for mode 2, B=52, M=720. In the present embodiment, on-chip memory 65 is provided for time deinterleaver 126. In other embodiments, a memory 66 external to receiver 100 can also be used.

After the time deinterleaver, the symbols are provided to forward error correction. First, inner FEC is performed. The inner FEC is an LDPC decoder 128 which is a soft-decision iterative decoder for decoding the Quasi-Cyclic Low Density Parity Check (QC-LDPC) code provided by the transmitter. In the present embodiment, the LDPC decoder 128 is configured to decode 3 different rates (rate 0.4, rate 0.6 and rate 0.8) of QC-LDPC codes while using the same circuitry. The iteration process is either stopped when it reaches the specified maximum iteration number (full iteration), or when the detected error is free during error detecting and correcting process (partial iteration).

The data are then passed to the outer FEC which is a BCH decoder 130. The BCH decoder 130 is constructed to decode BCH (762, 752) code, which is the shortened binary BCH code of BCH (1023, 1013). The generator polynomial is $1+x^{10}+x^3$.

In the present embodiment, the TDS-OFDM communication system is a multi-rate system based on multiple modulation schemes (QPSK, 16QAM, 64QAM), and multiple coding rates (0.4, 0.6, and 0.8), where QPSK stands for Quad Phase Shift Keying and QAM stands for Quadrature Amplitude Modulation. The output of BCH decoder 130 is a bit-by-bit data signal. Based on the selected modulation scheme and coding rate, a rate conversion block 132 operates to combine the bit output of BCH decoder 130 into bytes, and adjust the speed of byte output clock so that the MPEG packets outputted by receiver 100 are evenly distributed during the whole demodulation process.

Finally, under the TDS-OFDM transmissions scheme, the transmitted data is randomized using a pseudo-random (PN) sequence before the BCH encoder. Thus, the error corrected data by the LDPC/BCH decoder 128/130 must then be derandomized or descrambled. Descrambler 134 performs the descrambling using a PN sequence generated by the polynomial $1+x^{14}+x^{15}$, with initial condition of 100101010000000. Descrambler 134 will be reset to the initial condition for every signal frame. Otherwise, the descrambler will be free running until it is reset again. The least significant 8-bit of the PN sequence is XORed with the input byte stream.

Figure 4A:
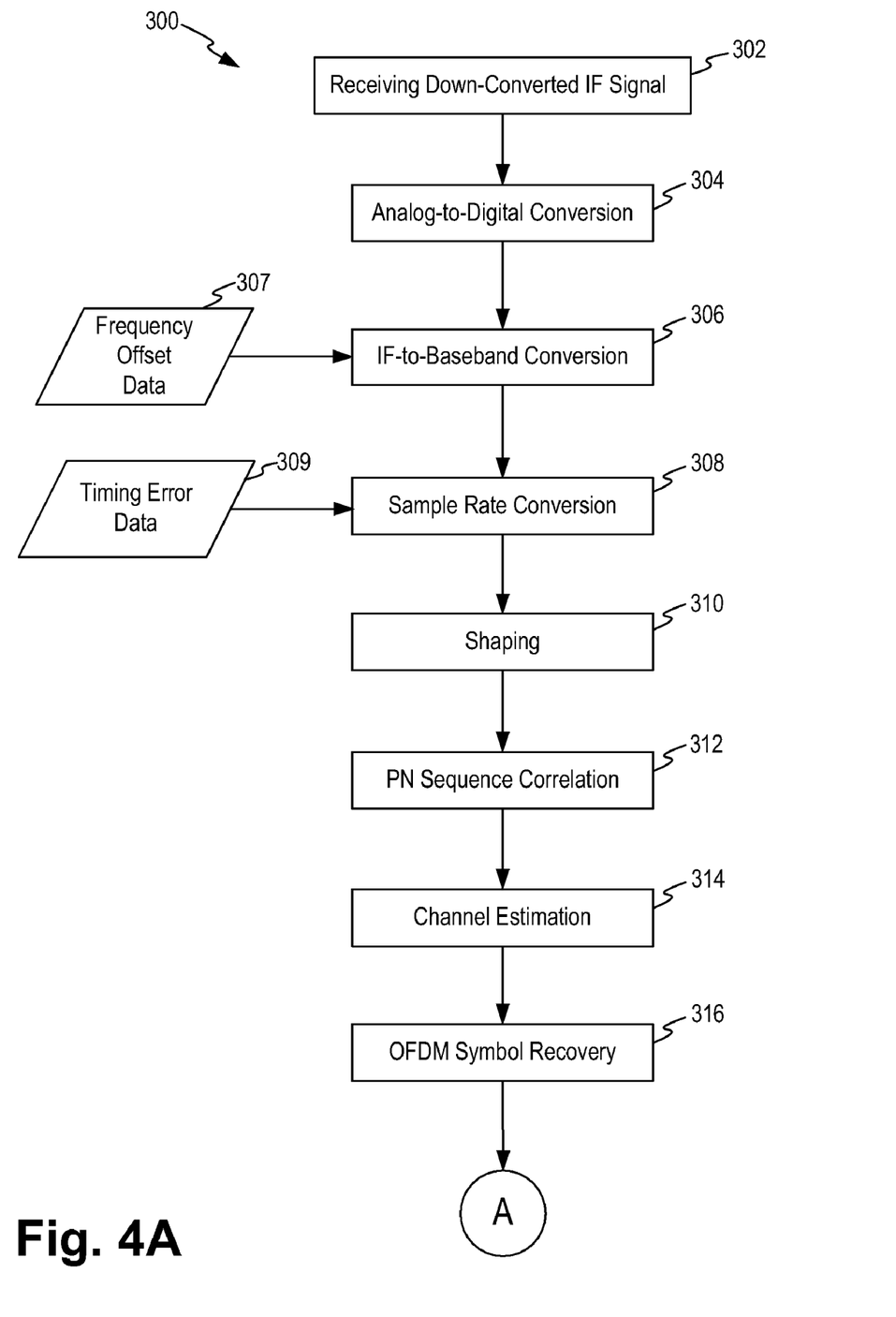
FIGS. 4A and 4B include a flow chart illustrating the data flow of the received RF signals through the LDPC-based TDS-OFDM receiver according to one embodiment of the present invention.
Figure 4B:
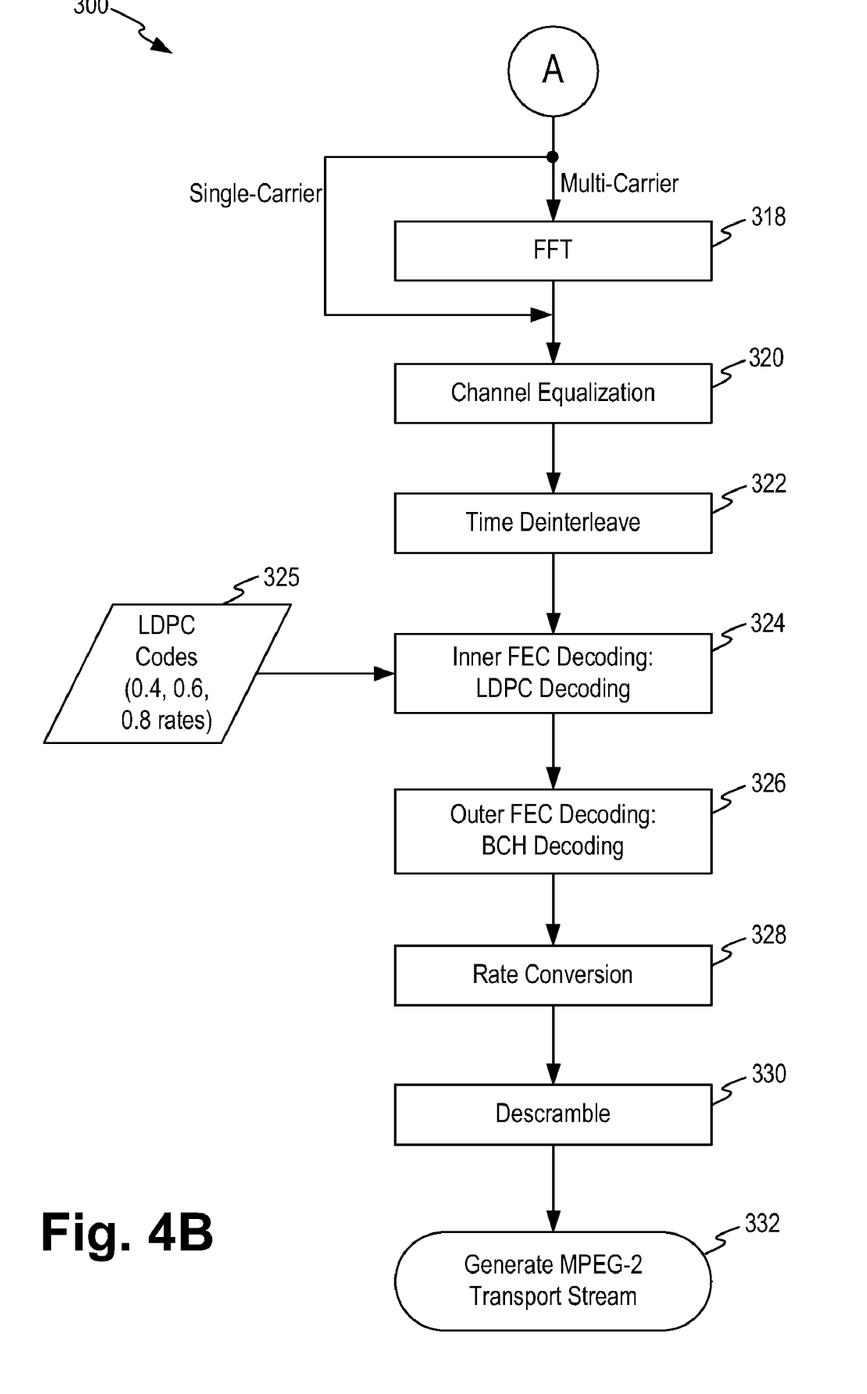

The data flow through the LDPC based TDS-OFDM receiver 100 is now described with reference to the flow chart of FIGS. 4A and 4B. Referring to FIG. 4A, a LDPC based TDS-OFDM demodulation method 300 starts by receiving the down-converted IF signal indicative of an LDPC encoded TDS-OFDM modulator RF signal (step 302). For instance, the RF signal can be received by a tuner which picks the frequency bandwidth of choice to be demodulated and then down-converts the RF signal to a baseband or low intermediate frequency (IF) signal. The downconverted IF signal is then converted to the digital domain through analog-to-digital conversion (step 304). The analog-to-digital conversion can be part of the demodulation method 300 or the ADC can be performed else where and the digitized IF signal being provided to the demodulation method 300. The digitized IF signal is then converted to a baseband signal (step 306). The IF-to-Baseband conversion is carried out using frequency offset date 307 obtained from an automatic frequency control operation.

The baseband signal is subjected to sample rate conversion (step 308). The sample rate conversion is carried out using timing error data 309 generated by the subsequent PN sequence correlation process (step 312) where the timing error data is fed back to the sample rate conversion step. After sample rate conversion, the signal is filtered using a Square Root Raised Cosine filter for shaping (step 310). The signal is then converted to symbols.

Then at step 312, the PN sequence information inserted in the guard interval of the signal frames is extracted and correlated with a local PN generator to find the time domain impulse response. The FFT of the time domain impulse response gives the estimated channel response (step 314). The PN sequence correlation is also used for the timing recovery to generate the timing error data 309 and the frequency estimation to generate the frequency offset data 307. The timing error and frequency offset data are used to correct the received signal.

The OFDM symbol information in the received data is then extracted (step 316). Referring now to FIG. 4B, in the multi-carrier mode, the OFDM symbols are passed through a 3780 FFT (step 318) to convert the symbol information back in the frequency domain. Using the channel estimation information obtained at step 314, the OFDM symbols are equalized (step 320) and the demodulation process continues.

When multi-carrier mode is selected, the symbols are subjected to a Fast Fourier Transform (FFT) operation (step 318). In the present embodiment, the FFT is a 3780-point FFT. The FFT converts the time domain information into a frequency domain signal. In some applications, a single-carrier mode is selected. In that case, the FFT operation (step 318) is bypassed as shown in FIG. 4B.

After the symbols are equalized (step 320), a time deinterleaving operation (step 322) is performed where the transmitted symbol sequence is subject to deconvolution. Then the 3780 blocks of symbol sequence is passed to the inner FEC decoder for LDPC decoding (step 324). The LDPC decoding is based on three LDPC codes of various rates (325) used to encode the transmitted signal. Then, the symbol sequence is passed to the outer FEC decoder for BCH decoding (step 326). The LDPC and BCH decoding operations run in a serial manner to take in exactly 3780 symbols, remove the 36 TPS symbols and process the remaining 3744 symbols. The LDPC and BCH decoding operations recover the transmitted transport stream information from the symbol sequence. Then, rate conversion (step 328) is performed to adjust the output data rate. Finally, the transport stream information is descrambled (step 330) to reconstruct the transmitted MPEG-2 transport stream information (step 332).

The above detailed descriptions are provided to illustrate specific embodiments of the present invention and are not intended to be limiting. Numerous modifications and variations within the scope of the present invention are possible. For example, in the present embodiment, the receiver generates MPEG-2 transport stream as the output signal. The use of MPEG-2 transport stream is illustrative only. The LDPC based TDS-OFDM receiver can generate digital output signals containing video, audio and data in any format desired by the user. The present invention is defined by the appended claims.

We claim:

1. An LDPC based TDS-OFDM receiver for receiving and demodulating an RF signal modulated using a TDS-OFDM (Time-Domain Synchronous Orthogonal Frequency-Division Multiplexing) modulation scheme and encoded using an LDPC (low density parity check) code, the RF signal being downconverted to an IF signal, the receiver comprising:

a synchronization block receiving a digital IF signal indicative of the IF signal and generating a baseband signal from the digital IF signal, the synchronization block performing correlation of a PN sequence in a signal frame of the received RF signal with a corresponding locally generated PN sequence, the PN sequence correlation providing signals for performing carrier recovery, timing recovery and parameters for channel estimation;

an equalization block for performing channel estimation and channel equalization;

an OFDM demodulation block for performing demodulation on the baseband signal, the OFDM demodulation block recovering OFDM symbols in the signal frame of the RF signal and converting the OFDM symbols to frequency domain; and a FEC (forward error correction) decoder block comprising an LDPC decoder for decoding the OFDM symbols based on the LDPC (low density parity check) code to generate a digital output signal indicative of the data content of the RF signal.

2. The LDPC based TDS-OFDM receiver of claim 1, wherein the IF signal comprises an analog IF signal and the receiver further comprises an analog-to-digital converter for digitizing the analog IF signal to the digital IF signal.

3. The LDPC based TDS-OFDM receiver of claim 1, wherein the RF signal is downconverted and digitized to the digital IF signal, the digital IF signal being coupled to the synchronization block of the receiver.

4. The LDPC based TDS-OFDM receiver of claim 1, wherein the synchronization block comprises:

an automatic frequency control block receiving the signals from the PN sequence correlation and generating a frequency offset value;

an IF-to-baseband conversion block for receiving the digital IF signal and converting the digital IF signal to a baseband signal, the IF-to-baseband conversion block receiving the frequency offset value;

a timing recovery block receiving the signals from the PN sequence correlation and computing a timing error value;

a sample rate converter receiving the timing error and converting the sample rate of the baseband signal based on the timing error;

a shaping block for applying a filtering function to the baseband signal; and a PN sequence correlator for performing the PN sequence correlation.

5. The LDPC based TDS-OFDM receiver of claim 4, wherein the shaping block applies a SRRC (Square Root Raised Cosine) filter function to the baseband signal.

6. The LDPC based TDS-OFDM receiver of claim 1, wherein the equalization block and the OFDM demodulation block comprise:

a channel estimation block receiving the signals from the PN sequence correlation and estimating the channel time domain response and computing the channel frequency response by taking the Fast Fourier Transform (FFT) of the time domain response;

an OFDM symbol restoration block for removing the PN sequence from the guard interval of the signal frame and recovering the OFDM symbols;

a FFT block for perform a Fast Fourier Transform (FFT) operation on the OFDM symbols to convert the symbols to the frequency domain; and a channel equalization block for performing equalization of the OFDM symbols based on the frequency response of the channel.

7. The LDPC based TDS-OFDM receiver of claim 6 wherein the RF signal comprises a multi-carrier RF signal.

8. The LDPC based TDS-OFDM receiver of claim 6, wherein the FFT block performs a FFT operation using a fixed FFT size of 3780.

9. The LDPC based TDS-OFDM receiver of claim 6 wherein the RF signal comprises a single-carrier RF signal and the Fast Fourier Transform operation is bypassed, the recovered OFDM symbols being provided directly to the channel equalization block.

10. The LDPC based TDS-OFDM receiver of claim 1, wherein the FEC block comprises:
the LDPC decoder for decoding the OFDM symbols based on the LDPC code used to encode the RF signal; and
a BCH decoder for decoding the OFDM symbols based on a BCH code used to encode the RF signal.

11. The LDPC based TDS-OFDM receiver of claim 10, wherein the LDPC code comprises a quasi-cycle LDPC (QC-LDPC) code selected from a group of quasi-cycle LDPC codes having a rate selected from 0.4, 0.6 and 0.8.

12. The LDPC based TDS-OFDM receiver of claim 11, wherein the group of quasi-cycle LDPC codes comprises a (7493,3048) QC-LDPC code with a rate of 0.4, a (7493,4572) QC-LDPC code with a rate of 0.6, a (7493,6096) QC-LDPC code with a rate of 0.8.

13. The LDPC based TDS-OFDM receiver of claim 10, further comprising a time deinterleaver for performing a convolutional deinterleaving of the OFDM symbols before the FEC decoder.

14. The LDPC based TDS-OFDM receiver of claim 1, further comprising:
a rate conversion block for combining the bit output of FEC decoder into bytes, and adjusting the speed of byte output clock to evenly distribute the output bytes; and
a descrambler for descrambling the input data stream using a pseudo-random (PN) sequence, thereby generating the digital output signal indicative of the data content of the RF signal.

15. The LDPC based TDS-OFDM receiver of claim 1, wherein the digital output signal comprises a MPEG-2 transport stream.

16. A method for demodulating an LDPC encoded TDS-OFDM modulated RF signal, comprising:
receiving a digital IF signal being down-converted from a RF signal;
converting the digital IF signal to a baseband signal;
performing synchronization of the baseband signal using the PN sequence in the signal frame of the RF signal;
generating signals for carrier recovery, timing recovery and channel estimation;
performing channel estimation using the signals for channel estimation;
recovering OFDM symbols from the baseband signals;
performing equalization of the baseband signal;
performing FEC decoding of the OFDM symbols, the FEC decoding comprising decoding the OFDM symbols based on an LDPC (low density parity check) code; and
generating a digital output signal indicative of the data content of the RF signal.

17. The method of claim 16, wherein performing synchronization of the baseband signal comprises:
performing a correlation of a PN sequence in the signal frame of the received RF signal with a corresponding locally generated PN sequence, the PN sequence correlation providing signals for determining the frequency offset, timing error and parameters for channel estimation;
converting the digital IF signal to the baseband signal using the frequency offset data;
converting the sample rate of the baseband signal using the timing error data; and
filtering the converted baseband signal using a filter function.

18. The method of claim 17, wherein filtering the converted baseband signal comprises filtering the converted baseband signal using a SRRC (Square Root Raised Cosine) filter.

19. The method of claim 16, wherein the LDPC encoded TDS-OFDM modulated RF signal comprises a multi-carrier RF signal, the method further comprising:
performing a Fast Fourier Transform of the OFDM symbols before equalization.

20. The method of claim 19, wherein performing a Fast Fourier Transform of the OFDM symbols before equalization comprises performing a Fast Fourier Transform of the OFDM symbols before equalization using a fixed FFT size of 3780.

21. The method of claim 16, wherein performing FEC decoding of the OFDM symbols comprises:
decoding the OFDM symbols based on the LDPC (low density parity check) code; and
decoding the OFDM symbols based on a BCH code.

22. The method of claim 21, wherein the LDPC code comprises a quasi-cycle LDPC code selected from a group of quasi-cycle LDPC (QC-LDPC) codes having a rate selected from 0.4, 0.6 and 0.8.

23. The method of claim 22, wherein the group of quasi-cycle LDPC codes comprises a (7493,3048) QC-LDPC code with a rate of 0.4, a (7493,4572) QC-LDPC code with a rate of 0.6, a (7493,6096) QC-LDPC code with a rate of 0.8.

24. The method of claim 16, wherein the LDPC encoded TDS-OFDM modulated RF signal comprises a single-carrier RF signal.

25. The method of claim 16, further comprising:
performing rate conversion of the decoded OFDM symbols by combining the bit output of FEC decoding into bytes, and adjusting the speed of byte output clock to evenly distribute the output bytes; and
descrambling the input data stream using a pseudo-random (PN) sequence, thereby generating the digital output signal indicative of the data content of the RF signal.

26. The method of claim 16, wherein the digital output signal comprises a MPEG-2 transport stream.

27. The method of claim 16, wherein prior to performing FEC decoding, performing time deinterleaving of the OFDM symbols.

* * * * *